Figure 1:
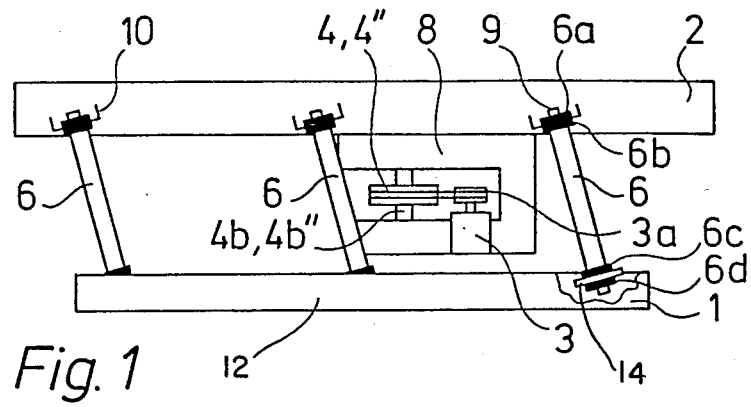

United States Patent [19]

Lehtola

[11] Patent Number: 4,768,647
[45] Date of Patent: Sep. 6, 1988

[54] VIBRATING CONVEYOR

[76] Inventor: Erkki T. Lehtola, SF-64240 Böle, Finland

[21] Appl. No.: 938,376

[22] Filed: Dec. 8, 1986

Related U.S. Application Data

[63] Continuation of Ser. No. 882,024, Jul. 3, 1986, abandoned, which is a continuation of Ser. No. 597,156, Feb. 6, 1984, abandoned.

[30] Foreign Application Priority Data

Jun. 10, 1982 [FI] Finland .................................. 822079
Jun. 10, 1983 [FI] Finland .................................. 822078

[51] Int. Cl.$^4$ ........................ B65G 27/20; B65G 27/28
[52] U.S. Cl. .................................. 198/760; 198/763; 198/767; 198/770
[58] Field of Search ............... 198/760, 763, 766, 767, 198/770

[56] References Cited

U.S. PATENT DOCUMENTS

| 2,830,696 | 4/1958 | Musschagt | 198/760 |
| 2,854,130 | 9/1958 | Adams | 198/763 |
| 2,951,581 | 9/1960 | Long et al. | 198/770 X |
| 3,358,815 | 12/1967 | Muschout et al. | 198/770 X |

FOREIGN PATENT DOCUMENTS

| 606585 | 10/1960 | Canada | 198/770 |
| 2528269 | 1/1977 | Fed. Rep. of Germany | 198/770 |
| 1077670 | 8/1967 | United Kingdom | 198/770 |

Primary Examiner—Robert J. Spar
Assistant Examiner—Lyle K. Kimms
Attorney, Agent, or Firm—Biebel, French & Nauman

[57] ABSTRACT

The invention relates to a vibrating conveyor in which the frame (1) and the trough (2) of the vibrating device are attached to each other by rigid bars (6). At the attachment points of the bars (6) to the trough (2) and to the frame (1) there are resilient components such as rubber discs (6a, 6b, 6c, 6d), axially fitted to the bars (6).

7 Claims, 2 Drawing Sheets

VIBRATING CONVEYOR

This application is a continuation of Ser. No. 882,024 filed July 3, 1986, now abandoned, which is a continuation of Ser. No. 597,156 filed Feb. 6, 1984, now abandoned.

The present invention relates to a vibrating conveyor, which comprises a frame, a supporting surface, connected to the frame, for the material to be handled, and a drive mechanism by means of which the reciprocal vibratory motion of the supporting surface is produced.

There are previously known several different types of vibrating conveyors which have a supporting surface, most commonly a trough, for the material to be conveyed, and in which the necessary vibratory motion is produced by a cam, compressed air, a camshaft, a magnet, or eccentric mass.

In principle, vibrating conveyors can be divided into conveyors in which the conveying motion and also the conveying of the material itself is horizontal and conveyors in which there is a vertical force component in addition to the horizontal force component. In the former conveyros the reciprocal motion of the trough is different when the trough moves forwards and when it moves backwards. The conveying effect is produced by having the trough move forwards slowly, whereas the return movement is rapid. The same effect is, of course, produced, if the trough moves forwards rapidly and thereafter the movement is suddenly stopped, at which time the material being conveyed continues its movement further under the effect of discontinuity. In this case the returning movement of the trough must be slow. Conveyors of this type, in which only a horizontal force component is effective, have a disadvantage in the packing of the material being conveyed and in the high wearing effect of friction between the material being conveyed and the conveyor. In the above-mentioned conveyors in which both a horizontal force component and a vertical force component are effective, the movement of the trough is oriented diagonally upwards. If the vertical force component is sufficient, there occurs an ejecting movement, whereby the material being conveyed detaches from the bottom of the trough and thus moves forwards.

Nowadays there are commonly used vibrating conveyors in which the vibratory motion of the trough is produced by the joint effect of a movement transmitted by a camshaft and of spring components, or by the joint effect of a rotating eccentric mass and spring components. The springs used are, for example, flat springs, helical springs, leaf springs, or in some cases rubber springs. In such systems, however, the structure and the method of attachment of the spring components is often complicated. In addition, the possibility of regulating the trough movement by means of springs is very limited. Known vibrating conveyors require firm securing to the base owing to dynamic horizontal and vertical forces. Known vibrating conveyors have a further disadvantage in that they produce a great deal of noise when running empty.

The object of the invention is to provide a resilient attachment between the vibrating conveyor frame and its trough or other similar part, the attachment being simple and the movement of the trough or other similar part being regulatable in a simple manner by means of the attachment.

The object of the invention is also to provide a vibrating conveyor which is inexpensive, simple and easy to operate, as well as easy to attach to its base. A further object is to provide a vibrating conveyor which produces as little disturbing noise as possible.

The main characteristics of the invention are given in the accompanying claims.

Figure 2A:
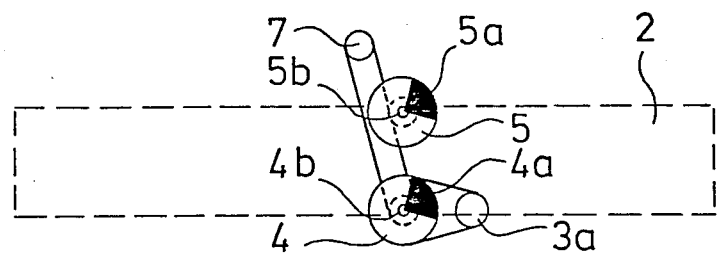
Figure 2B:
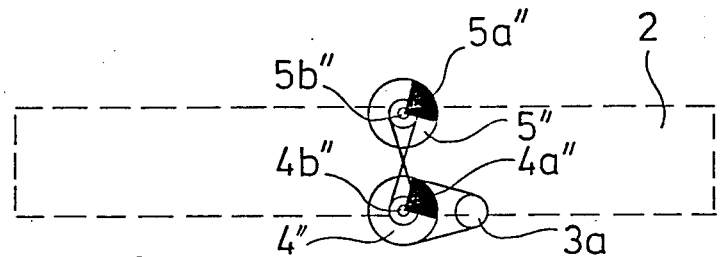
Figure 3:
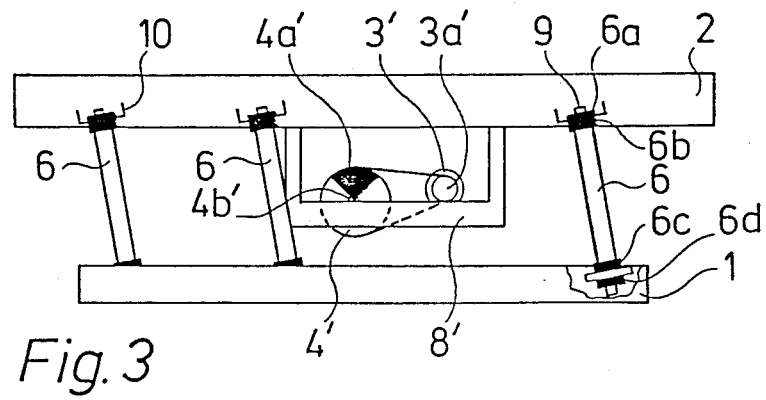
Figure 4:
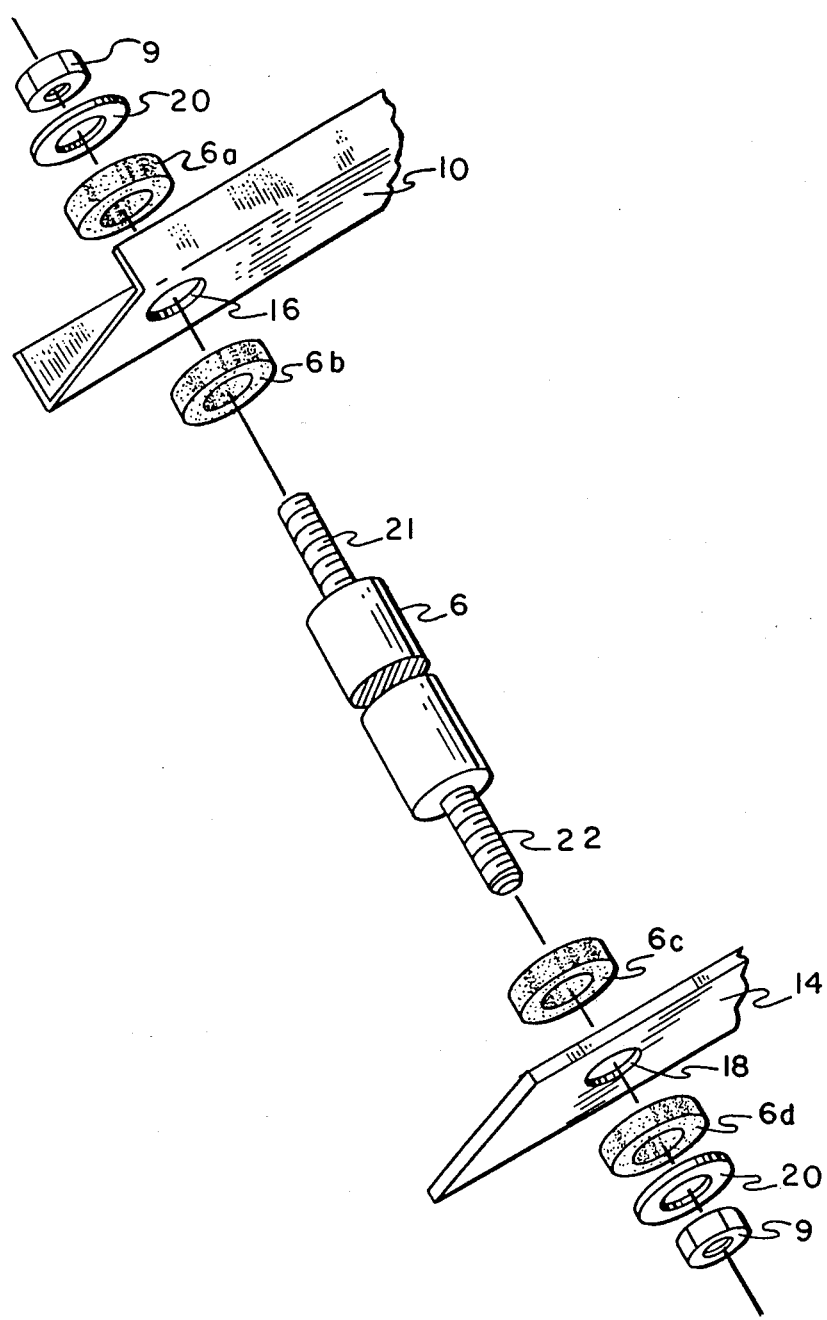

The vibrating conveyor according to the invention is described below in greater detail with reference to the accompanying drawing, in which FIG. 1 depicts a side view of a vibrating conveyor according to the invention, FIG. 2a depicts a top view of a detail of the structure according to FIG. 1, FIG. 2b depicts a top view of another detail of the structure according to FIG. 1, FIG. 3 depicts a side view of another vibrating conveyor according to the invention, and FIG. 4 is an exploded, prespective view showing a detail of a bar, in which the central portion of the bar is broken away.

In FIGS. 1 and 3, reference numeral 1 indicates the conveyor frame, which consists of two parallel beams 12 and of two transverse beams 14 connecting them. The trough 2 is supported by bars 6. The trough 2 has protrusions 10, which have openings 16 (see FIG. 4) for the ends of the bars 6. Likewise, the transverse beams of the frame structure 1 have openings 18 for the opposite ends of the bars. At the points of attachment of the bars 6 to the frame 1 and to the trough 2 there are resilient components, which consist of rubber discs 6a, 6b, 6c and 6d. The ends (21, 22) of the bars 6 are threaded, and the bars 6 are attached to the frame 1 and the trough 2 by means of nuts 9, washers 20 being advantageously used between the rubber discs and the nuts 9. It is also possible to use other known fastening methods. Instead of rubber discs 6a, 6b, 6c and 6d it is possible to use different types of resilient plastic components or springs, such as steel spiral springs. The resilient components of rubber or the like are preferably circular, but they may also have some other shape, for example square. In addition, the rubber discs may consist of two halves, which facilitates their replacing. Also, several rubber discs can be fitted one on top of the other.

In FIGS. 1, 2a and 2b, the motor 3 is attached to a supporting structure 8, which for its part is attached to the trough 2. The vertical shaft 4b (or 4b'') of the belt pulley 4 (or 4''), which has been disbalanced by means of a coutnerweight 4a (or 4a''), is fixed by means of a bearing to the supporting structure 8. By V-belt transmission, the motor 3 rotates the belt pulley 4 (or 4''). In the figures, the belt pulley of the motor 3 is indicated by numeral 3a. Next to the belt pulley 4 (or 4'') there is a wheel 5 (or 5'') of the same shape, disbalanced by means of a counter-weight 5a (or 5a''). The vertical shaft 5b (or 5b'') of the wheel 5 (5'') is also fixed by means of a bearing to the supporting structure 8. The motor 3 also rotates the wheel 5 (or 5'') by transmission of the belt pulley 4 (or 4''). FIGS. 2a and 2b depict two embodiments of the implementation of this transmission. In FIG. 2a, a chain is tightened around the sprocket of the pulley 4 and the idler wheel 7. The chain has also been fitted to the sprocket of the wheel 5. In FIG. 2b, a cogged belt has been installed crosswise around the belt pulleys of the wheels 4'' and 5''. In order that the cogged belt should not chafe at the crossing point, the shafts 4b'' and 5b'' have been installed somewhat obliquely in relation to each other. In both these embodiments the motor 3 rotates the wheels 4 and 5 (or 4" and 5") at the same speed but in opposite directions. In addition, the motion of the wheels 4 and 5 (or 4" and 5") has been synchronized to the same phase. This means that the counterweights 4a and 5a (or 4a" and 5a") in the wheels 4 and 5 (or 4" and 5") face simultaneously towards the conveying direction of the vibrating conveyor and, of course, also simultaneously against the conveying direction. When the weights 4a and 5a (or 4a" and 5a") are in these positions, the reciprocal vibratory motion of the trough 2 is produced. When the weights 4a and 5a (or 4a" and 5a") face towards the sides, the force components cancel out each other, at which time no lateral movement occurs. The bars 6 provided with rubber discs 6a, 6b, 6c and 6d increase the vibratory motion of the trough 2. The bars 6 are preferably installed in such a way that they are oblique to the conveying direction of the material.

FIGS. 1 and 2 depict only two ways in which the wheels 4 and 5 (or 4" and 5") can be caused to rotate at the same speed in opposite directions. This can also be implemented by using chain, belt or cog-wheel transmission, or combinations of the same. It is also possible to use tow separate motors.

In FIG. 3, the motor 3' is attached to the supporting structure 8', which for its part is attached to the trough 2. The horizontal shaft 4b' of the belt pulley 4' which has been disbalanced by means of the counterweight 4a' is fixed by means of a bearing to the supporting structure 8'. By V-belt transmission the motor 3' rotates the belt pulley 4'. In FIG. 3, the belt pulley of the motor 3' is indicated by numeral 3a'. When the counterweight 4b' faces towards the conveying direction of the vibrating conveyor, or against it, the pulley 4' produces a horizontal force component. When the counterweight 4b' faces upwards or downwards, the pulley 4' produces a vertical force component. The vibratory motion of the trough 2 is produced by the combined effect of these force components and the bars 6 provided with rubber discs 6a, 6b, 6c and 6d, and thereby the material is conveyed forwards along the trough 2. The bars 6 are, as can be seen from FIG. 3, fitted in such a way that they are oblique to the conveying direction of the material.

The vibrating conveyors described above have very few parts which wear out and require maintenance. The maintenance involves only the lubrication of the wheels and the bearings. In addition, the dynamic horizontal and vertical forces produced by the vibrating conveyor are very slight and so the vibrating conveyor can be attached very simply to the base.

The movement of the material being conveyed on the trough 2 can be regulated in various ways, for example by varying the rotational velocity of the motor 3 or 3' and/or by varying the counterweights 4a and 5a, or 4a" and 5a", or 4a'. The vibratory motion can also be regulated by varying the size of the rubber discs 6a, 6b, 6c and 6d and the properties (hardness/softness) of the rubber. In addition, the rubber discs 6a, 6b, 6c and 6d can be compressed by means of nuts 9 at the ends of the bars 6. This is a rapid and easy procedure, and such a possibility for regulation is significant in, for example, the conveying of waste wood, as summer or winter conditions affect the properties of the material being conveyed. Likewise, such a possibility of regulation is important in, for example, feed conveyors when conveying varying material and/or varying quantities of material.

Only two types of drive mechanisms have been described above. The vibrating conveyor according to the invention is not limited to these described operating mechanisms, but they can be varied, or different types of drive mechanisms can be used. The drive mechanism used can be, for example, a 2-wheel system, in which eccentric wheels rotating in different directions are on the same vertical or horizontal shaft. It is also possible to use encased drive mechanisms. In the embodiments depicted in the figures, the shafts of the eccentric wheels are substantially vertical or horizontal, but it is also possible to install the shafts in such a way that they are oblique to the trough. Furthermore, the drive mechanism used can be a motor-driven camshaft, the movement of which is transmitted to the trough by means of one or several driving rods attached to the trough.

The drive mechanism can be installed at any point of the trough, for example, in the middle of the trough. When very long troughs are used, several drive mechanisms can be used.

The material used for the trough can be, for example, ordinary steel plate or aluminum or, depending on the material to be conveyed, also some special material such as a material which resists heat and wear. Instead of a trough, some other system can be used, for example, a closed conveyor, whereby dust and other detrimental materials are avoided. The trough can also be fitted with a sieve zone. This is advantageous when a vibrating conveyor is used in connection with chippers, because thereby sawdust and other fine fractions can be separated and removed at a point prior to the chipper.

Vibrating conveyors according to the invention can be used for conveying round timber, strips of wood, chips, sawdust, ores, gravel, coal, fertilizers, waste, packaged goods, etc.

I claim:

1. A vibrating conveyor, comprising:
   a frame including a plurality of transverse beam with openings therethrough;
   trough means superposed to said frame and including a plurality of protrusions extending sidewardly therefrom, each of said protrusions having an opening therethrough;
   a plurality of bars extending between said beams and said protrusions, each of said bars having a lower, integral threaded end shaped to fit within a selected one of said openings in said beams and extending from said bar to form a lower shoulder therewith, and an upper, integral threaded end shaped to fit within a selected one of said protrusion openings and extending from said bar to form an upper shoulder therewith, such that said trough means is supported by said bars;
   upper and lower nut means threaded on said upper and lower ends of said bars, respectively, thereby securing said bars to said protrusions and to said beams;
   upper and lower pair of annular resilient means journaled into said upper and lower threaded ends of said bars, respectively, such that, for each of said bars, one of said resilient means of said upper pair is clamped between said upper shoulder and said protrusion and the other of said upper pair is clamped between said upper nut means and said protrusion, and one of said lower pair of resilient nut means is clamped between said lower shoulder and said beam and the other of said lower pair is clamped between said lower nut means and said beam;

driving means including motive means and eccentric rotating means driven by said motive means and connected to said trough means for imparting a substantially horizontal reciprocal motion thereto.

2. The vibrating conveyor of claim 1 wherein said driving means is mounted on and supported by said trough means.

3. The vibrating conveyor of claim 1 wherein each of said bar ends includes means positioned adjacent to said nut means and adjacent to a remainder of said bar to restrain said resilient means therebetween.

4. The vibrating conveyor of claim 1 wherein said resilient means comprises discs made of a material selected from the group consisting of rubber and plastic.

5. The vibrating conveyor of claim 1 wherein said eccentric rotating means are mounted on a plurality of substantially vertical shafts attached to said trough means.

6. The vibrating conveyor of claim 5 wherein said motive means includes a crosswise belt transmission connected to and effecting rotation of said eccentric rotation means; and wherein said vertical shafts are oblique in relation to each other.

7. The vibrating conveyor of claim 1 wherein said eccentric rotating means includes eccentric mass mounted on said trough means to rotate in an essentially vertical plane.

* * * * *